US010706242B2

(12) United States Patent
Wu et al.

(10) Patent No.: US 10,706,242 B2
(45) Date of Patent: Jul. 7, 2020

(54) RFID ANTENNA RE-LOCATION AND/OR RFID LOCATION

(71) Applicant: INTEL CORPORATION, Santa Clara, CA (US)

(72) Inventors: Michael Wu, San Jose, CA (US); Addicam V. Sanjay, Gilbert, AZ (US); Daniel Gutwein, Chandler, AZ (US); Hoang Tran Van, Phoenix, AZ (US); Kalpana Algotar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 376 days.

(21) Appl. No.: 15/199,400

(22) Filed: Jun. 30, 2016

(65) Prior Publication Data

US 2018/0004986 A1    Jan. 4, 2018

(51) Int. Cl.
*G06K 7/10* (2006.01)
(52) U.S. Cl.
CPC .............................. *G06K 7/10356* (2013.01)
(58) Field of Classification Search
CPC ...... G06Q 30/02; G06Q 10/087; G06Q 20/32; G06Q 20/102; G06Q 20/1235; G06Q 20/322; G06Q 20/3223; G06Q 20/387; G06Q 20/405; G06Q 30/0222; G06Q 30/0261; G06Q 30/0601; G06Q 10/06; G06Q 20/1085
USPC ............. 340/10.1, 10.3, 10.31, 10.32, 10.33, 340/10.34, 10.4, 10.42
See application file for complete search history.

(56) References Cited

U.S. PATENT DOCUMENTS

| 8,686,734 B2 * | 4/2014 | Martin ................... H04N 7/181 |
| | | 324/501 |
| 2005/0246334 A1 * | 11/2005 | Tao ......................... G01S 5/0252 |

(Continued)

FOREIGN PATENT DOCUMENTS

| CN | 101344932 B * | 6/2013 | ......... G06K 7/10336 |
| WO | WO2014-203041 A1 | 12/2014 | |
| WO | WO2015077829 A1 | 6/2015 | |

OTHER PUBLICATIONS

International Search Report and Written Opinion dated Jul. 28, 2017 for International Application No. PCT/US2017/035275, 14 pages.

*Primary Examiner* — Yong Hang Jiang
(74) *Attorney, Agent, or Firm* — Schwabe, Williamson & Wyatt, P.C.

(57) ABSTRACT

In various embodiments, an RFID Antenna/Tag Location Configuration device (RLC) may facilitate placement of one or more RFID antennas in a physical space. The RLC may collect RFID data from tags determine which of the RFID antennas need to be relocated. The RLC may determine, based on collected RFID data, whether each antenna is a dominant antenna and/or has a substantial read rate. If an antenna is not dominant and/or does not exhibit a substantial read-rate, the RLC ma indicate that the antenna should be relocated. The RLC may also be configured to filter collected RFID data prior to using the data for determination of antennas. The RLC may also determine, using the RFID antennas, a physical location of RFID tags in the physical space using detected signal strength for RFID tags. Additional embodiments may be described and/or claimed.

25 Claims, 13 Drawing Sheets

(56) References Cited

U.S. PATENT DOCUMENTS

| | | | |
|---|---|---|---|
| 2006/0022800 A1* | 2/2006 | Krishna | G06K 17/0029 340/10.2 |
| 2006/0208859 A1* | 9/2006 | Hougen | G06K 7/0008 340/10.1 |
| 2007/0099623 A1* | 5/2007 | Stephensen | H04W 16/18 455/446 |
| 2008/0181398 A1* | 7/2008 | Pappu | H04L 9/085 380/44 |
| 2008/0283599 A1* | 11/2008 | Rasband | G06K 7/0008 235/439 |
| 2013/0201003 A1 | 8/2013 | Sabesan et al. | |
| 2014/0240097 A1* | 8/2014 | Karani | G06Q 10/06 340/10.1 |
| 2014/0263636 A1 | 9/2014 | Jones et al. | |
| 2016/0139238 A1* | 5/2016 | Bekkali | G01S 5/0252 342/463 |

* cited by examiner

Fig. 4

| TagNo | SN00105 | SN00111 | SN00035 | SN01143 | SN00055 |
|---|---|---|---|---|---|
| 23 | 13 | 268 | 10243 | 23 | 19 |

Fig. 5

| TagNo | SN00105 | SN00111 | SN00035 | SN01143 | SN00055 |
|---|---|---|---|---|---|
| 23 | 0.123036154 | 2.53643763 | 96.9430248 | 0.217679349 | 0.179822071 |

Fig. 7

| Shelf-Antenna Pair | Count of Reads | Dominant Antenna Breakdown |
|---|---|---|
| A-SN01210 | 20 | 0.215053763 |
| A-SN01276 | 52 | 0.559139785 |
| A-SN01277 | 21 | 0.225806452 |
| Total Reads in Shelf A | 93 | 1 |

Table 700

Fig. 8

| Rack | Antenna | Percentage Breakdown |
|---|---|---|
| H1 | SN01210 | 0.132142857 |
| L1 | SN01210 | 0.166666667 |
| I1 | SN01210 | 0.172103175 |
| J1 | SN01210 | 0.248039216 |
| H0 | SN01210 | 0.272727273 |
| I0 | SN01210 | 0.426785714 |

Table 800

Fig. 9

| Rack | Antenna | Percentage Breakdown |
|---|---|---|
| H1 | SN01210 | 0.132142857 |
| L1 | SN01210 | 0.132142857 |
| I1 | SN01210 | 0.166666667 |
| J1 | SN01210 | 0.172103175 |
| H0 | SN01210 | 0.248039216 |
| I0 | SN01210 | 0.272727273 |

Table 700

Fig. 10

| Rack | Antenna | Read-Rate |
|---|---|---|
| H1 | SN01210 | 0.4 |
| I1 | SN01210 | 7.75 |
| J1 | SN01210 | 33.15 |
| K1 | SN01210 | 57.325 |
| L1 | SN01210 | 57.56666667 |
| G0 | SN01210 | 67.21 |
| H0 | SN01210 | 68.71666667 |
| K0 | SN01210 | 73.94 |
| I0 | SN01210 | 83.01666667 |
| G1 | SN01210 | 116.82 |

Fig. 11

| Rack | Antenna | Read-Rate |
|---|---|---|
| H1 | SN01210 | 0.4 |
| I1 | SN01210 | 0.4 |
| J1 | SN01210 | 0.4 |
| K1 | SN01210 | 0.4 |
| L1 | SN01210 | 0.4 |
| G0 | SN01210 | 1.4 |
| H0 | SN01210 | 2.4 |
| K0 | SN01210 | 3.4 |
| I0 | SN01210 | 4.4 |
| G1 | SN01210 | 5.4 |

RFID ANTENNA RE-LOCATION AND/OR RFID LOCATION

TECHNICAL FIELD

The present disclosure relates to the field of radio frequency identification (RFID). In particular, the present disclosure is related to apparatuses, methods and storage media associated with facilitating RFID antennas and location of RFID tags in a physical space.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

RFID tags are increasingly used to keep track of objects which are placed throughout physical spaces. For example, RFID tags may be utilized to keep track of inventory in a store or warehouse. Various inventory items, item containers, or location units in which the items may be placed (such as shelves, racks, tables, etc.) may be tagged with RFID tags. By reading information from these tags, the RFID antennas, along with associated tracking technology, may be able to keep track of which items are in the space. However, achieving proper coverage of many antennas in a space can be a difficult prospect for one, often leading to a trial-and-error process which may result in less-than-optimal placement. Further, even when antennas provide for adequate coverage, users of a tracking systems may desire to know more than simply which items are located in a space. In some scenarios, users may desire to know the locations of objects; however, this often requires the collection and storage of substantial amounts of location information, which is difficult to keep updated in a timely manner.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

FIGS. 4 and 5 illustrate example data sets used when filtering collected RFIC data, in accordance with various embodiments.

FIGS. 7-11 illustrate example data sets used when filtering collected RFIC data, in accordance with various embodiments.

DETAILED DESCRIPTION

Figure 1:
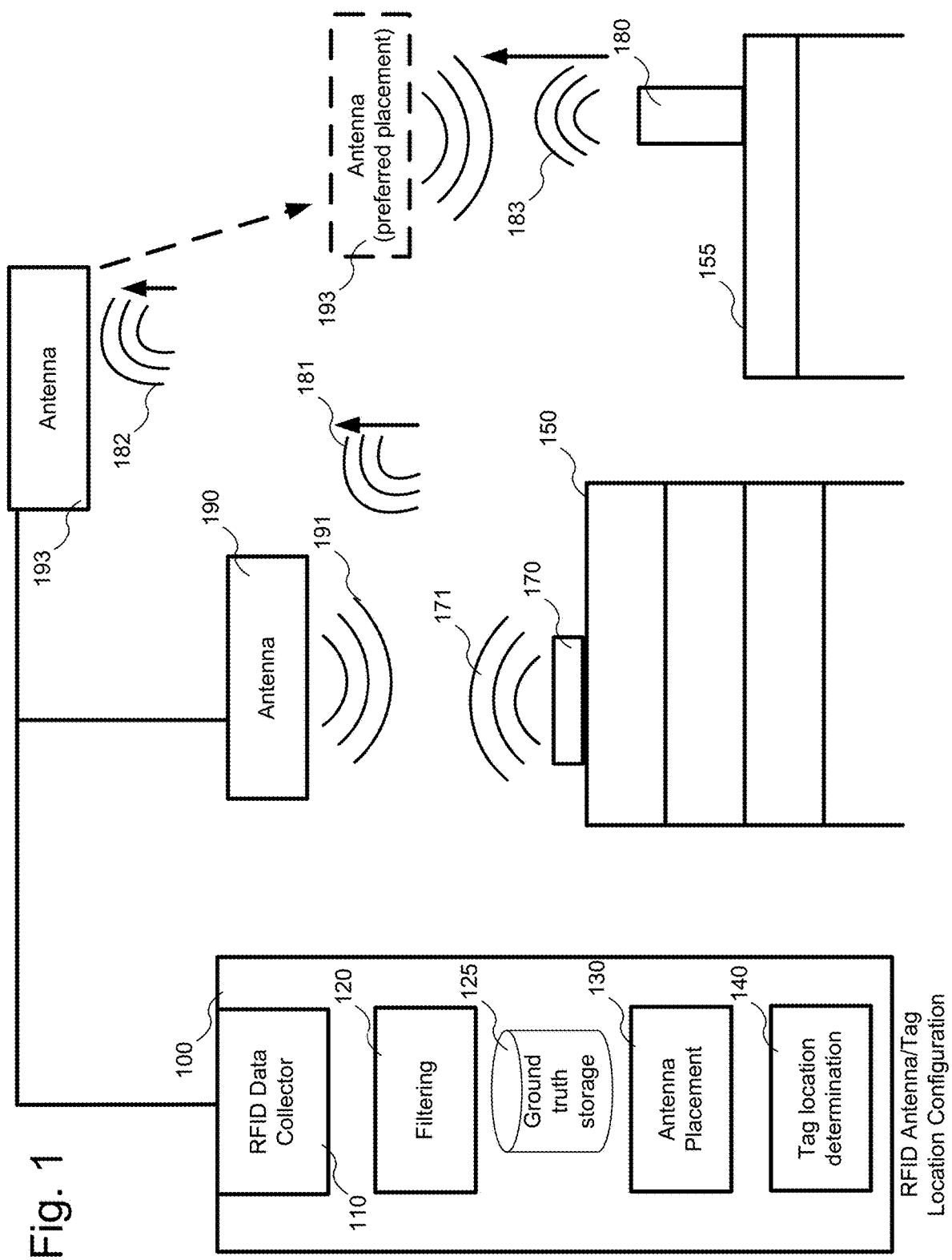
FIG. 1 illustrates example components of an RFID antenna/tag location configuration system (RLC), in accordance with various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs having machine instructions (generated from an assembler or compiled from higher level languages, a combinational logic circuit, and/or other suitable components that provide the described functions/functionalities. As described herein, the term "logic" and "module" may refer to, be part of, or include a System on a Chip, as described below.

In various embodiments, an RFID Antenna/Tag Location Configuration device (RLC) may be configured to facilitate location determinations for RFID antennas and/or tags located in a physical space. In various embodiments the RLC may be configured to facilitate placement of one or more RFID antennas in a physical space in order to best read RFID data from one or more RFID tags which are located in the physical space. In various embodiments, the RLC may be configured to collect RFID data from tags located in the space and use the data to determine which of the RFID antennas, if any, need to be relocated to better read RFID tags in the space. In various embodiments the RLC may be configured to determine, based on collected RFID data, whether each antenna is a dominant antenna for at least one shelf/rack/table or other location unit. In various embodiments, the RLC may additionally, or in lieu of a dominant antenna determination, determine whether the each antenna has a substantial read rate for at least one shelf/rack/table or other location unit. In various embodiments, if an antenna is not a dominant antenna and/or does not exhibit a substantial read-rate, the RLC ma indicate that the antenna should be relocated to obtain better readings. In various embodiments, the RLC may be configured to filter collected RFID data prior to using the data for determination of antennas. In various embodiments, the RLC may repeat collection and filtering of RFID data and antenna relocation determination after one or more antennas have been moved based on previous determinations. As such, through repeated uses of the RLC, RFID antennas may be more optimally placed in the physical space to better read RFID data from tags in the space.

In various embodiments the RLC may also be configured to determine, using the RFID antennas, a physical location of one or more RFID tags in the physical space. The RLC may be configured to detect a signal strength for information received by an RFID antenna from an RFID tag, and to determine, for a given RFID antenna, a direct physical distance of the RFID tag from the antenna. The RLC may also be configured to determine, through utilization of multiple determined direct distances, coordinates for a location of the read tag. In various embodiments, the RLC may consider multiple coordinate candidates and may select the coordinate candidate which has the smallest difference when the coordinates are summed. Additional embodiments and implementation details for structures and activities of the RLC are described below.

FIG. 1 illustrates components of an RLC 100, in accordance with various embodiments. As illustrated, the RLC 100 may be communicatively coupled with one or more RFID antennas 190. The RFID antennas 190 may be disposed in multiple locations in a physical space. As illustrated in FIG. 1, various antennas 190 may be located at different locations on an XY plane associated with a space, and/or at different heights (Z axis). Similarly, RFID tags, which may be associated with items, may be located at different locations in XYZ space. In various embodiments, RFID tags may be associated with various items. These items may be located on various location units in the physical space, such as shelf 150, table 155, racks, etc. For the sake of efficient description, such location units will be referred to herein as "shelf 150". However it may be recognized that no particular limitation is intended by such reference.

In various embodiments, the antennas 190 may operate to broadcast requests for RFID data from RFID tags (as illustrated with the signal 191 emanating from antenna 190) and may, in turn, receive response signals from RFID tags, such as the response signal 171 from an RFID tag associated with item 170. In various embodiments, the response signals may have different signal strengths; these signal strengths may be based, in part, on a distance that each RFID antenna 190 is from each RFID tag. Thus, for example, a tag associated with item 180 will have a response signal 182 with a low signal strength for antenna 190, which is relatively far away, while it will exhibit a response signal 181 with a lower signal strength to antenna 193, which is located farther away. Similarly, when antenna 193 is relocated (such as due to the activities of the RLC 100), the antenna 193 will receive a response signal 183 from the RFID tag associated with item 180 that has a higher strength than response signal 181. In various embodiments, utilizing the relative signal strengths of response signals received by different antennas 190, the RLC 100 may be configured to determine locations of tags in the space, and therefore locations of items, such as item 180. In various embodiments, receipt of a response signal from an RFID tag may be referred to herein as a "read" of the RFID tag.

In various embodiments, the RLC 100 may include various modules to facilitate performance of the antenna and tag location configuration techniques described herein. In various embodiments, these modules may be implemented in hardware and/or software; various implementation details are described below with reference to FIGS. 18 and 19. In various embodiments, the RLC 100 may include an RFID data collector 110 (DC 110), which may be configured to collect RFID data read by one more RFID antennas 190. In various embodiments, such RFID data may include, for a given RFID tag, a tag identifier, an item identifier, an identifier of a shelf 150 on which the item associated with the RFID tag, a location of the tag, etc.

In various embodiments, the RLC 100 may include a filtering module 120 (FM 120) which may be configured to filter out RFID data which was collected by the RFID collector 110. In various embodiments, the FM 120 may be configured to filter out RFID data which is less useful for determination of antennas 190 which should be relocated. In various embodiments, the filtering module may filter out RFID data for tags read by non-dominant antennas, as described below. In other embodiments, the FM 120 may be configured to filter out RFID data for tags for which no ground truth is known. In various embodiments, such ground truth may include known or suspected locations for one or more RFID tags in the physical space. In various embodiments, this location information may include information about a shelf 150 (or other location unit) on which the RFID tag (or item associated with the RFID tag) may be found. In various embodiments, such ground truth may include a last known good location. In various embodiments, by using this ground truth, and by filtering out RFID data which is not associated with known ground truth, the RLC 100 may better determine which shelves 150 are covered by which RFID antennas 190, and suggest other RFID antennas for relocation. In various embodiments, the ground truth may be stored and maintained on ground truth storage 125, as may be understood.

In various embodiments, the RLC 100 may include an antenna placement module 130 (AP 130). In various embodiments, the AP 130 may be configured to determine, based on the filtered collected RFID data, which of the antennas 190 should be relocated. In various embodiments the AP 130 may determine which of the antennas is a dominant antenna for a shelf 150. In various embodiments, the AP 130 may be configured to determine which antennas have a substantial read-rate for a shelf 150. In various embodiments, if an antenna has neither of these qualities, the AP 130 may determine that the antenna should be relocated.

In various embodiments, the RLC 100 may include a tag location determiner 140 (TLD 140), which may be configured to determine a physical location for an RFID tag based on signal strength for responses received by various antennas 190 from the RFID tag. In various embodiments, the TLD 140 may make its location determination based on known physical location information for the one or more antennas 190. In various embodiments, the TLD 140 may be utilized after relocation of one or more antennas 190, such as through operation of the RLC 100. In various embodiments, the TLD 140 may be configured to determine a direct physical distance between each antenna 190 and an RFID tag. The TLD 140 may then be further configured to determine the location of the tag in physical space based on these direct distances and the known location information of the antennas 190.

Figure 2:
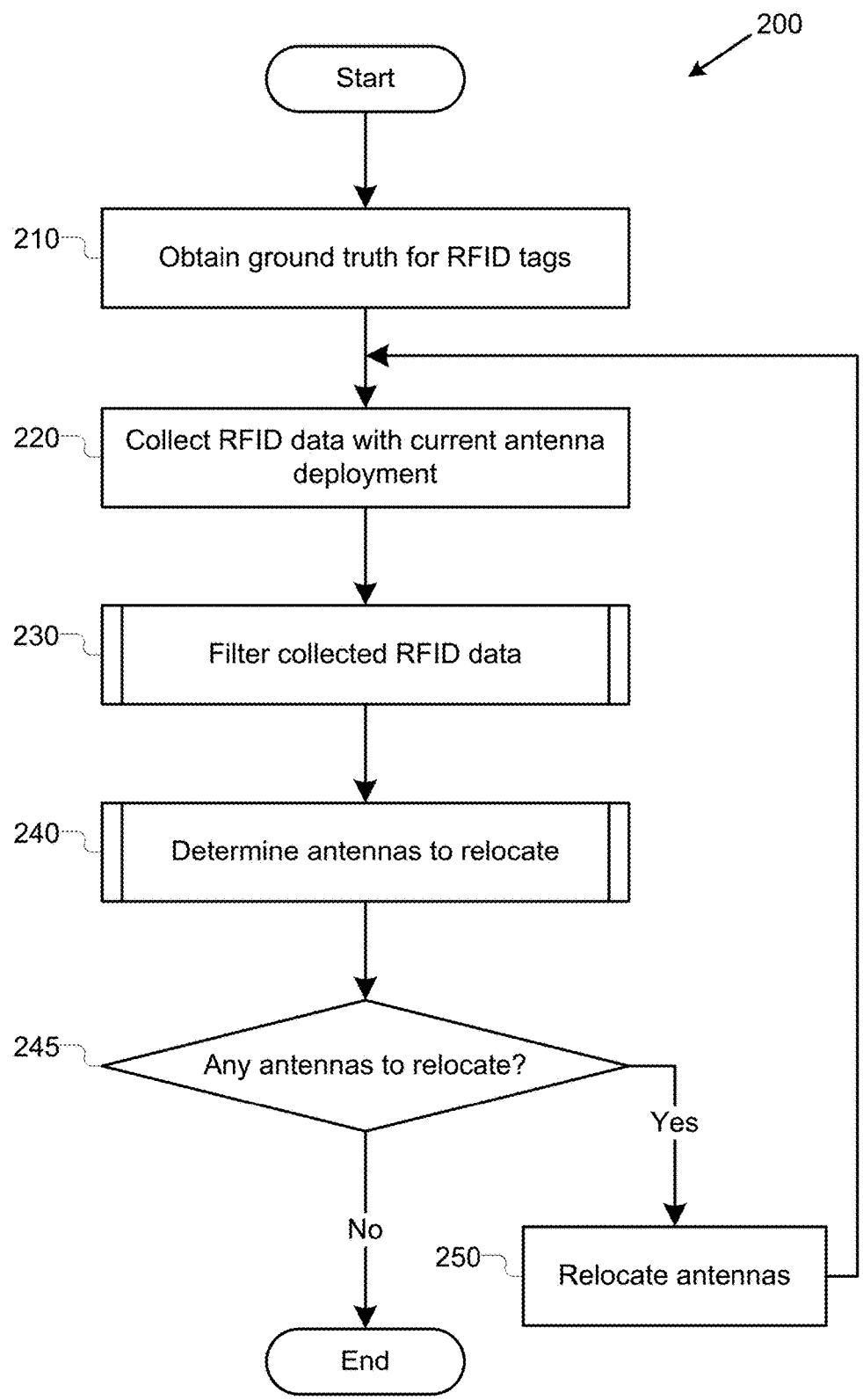
FIG. 2 illustrates an example process for the RLC to facilitate relocation of RFID antennas, in accordance with various embodiments.

FIG. 2 illustrates an example process 200 for the RLC 100 to facilitate relocation of RFID antennas, in accordance with various embodiments. In various embodiments, algorithmic structures for the various modules of the FM 110 and AP 130 may be described with reference to FIG. 2. It may be noted that, while particular ordering of information flows are illustrated, in various embodiments, operations may be otherwise ordered or omitted, or additional operations may be included. The process may begin at operation 210, where the RLC 100 may obtain ground truth for one or more RFID tags in the physical space. This ground truth may be obtained, in various embodiments, through manual entry and/or individual scanning of RFID tags. In various embodiments, users may provide location information, such as information about which shelves 150 each provided RFID tag is located at. In various embodiments, the ground truth obtained at operation 210 may include knowledge of where particular shelves 150 are located in the physical space. In various embodiments, this information may be used after determination of which antennas 190 need to be moved to relocate antennas 190 near shelves 150 which are not being covered by the a current deployment of antennas 190.

Next, at operation 220, the DC 110 may collect RFID data using a current deployment of antennas 190. In various embodiments, at operation 220 the DC 110 may cause the antennas 190 to broadcast requests for RFID information from RFID tags and to, in turn, receive RFID response signals from the RFID tags. In various embodiments, the DC 110 may collect RFID data that is otherwise already being received by the one or more antennas 190. As discussed above, in various embodiments, the DC may collect various types of RFID data, including, but not limited to, tag identifiers, item identifiers, identifier of shelves 150 on which item are located, tag locations, etc.

Next, at operation 230, the FM 120 may filter the collected RFID data, in order to reduce the data set for which antenna location determinations are later made. In various embodiments, particular implementation details of operation 230 may be described below with reference to process 300 of FIG. 3. Next, at operation 240, the AP 140 may determine which, if any, antennas 190 should be relocated in order to improve coverage of RFID tags in the physical space. In various embodiments, particular implementation details of operation 240 may be described below with reference to process 500 of FIG. 5.

Next, at decision operation 245, the AP 130 may determine whether there are any antennas 190 to relocate. If not, then the process may end. If so, then at operation 250, these antennas may be relocated. In various embodiments, the antennas may be relocated by users of the RLC 100. In various embodiments, location information for one or more shelves 150 may be utilized to move antennas near to shelves which have not been covered by other, non-moved, antennas. In various embodiments, the RLC 100, and in particular the AP 130 may be configured to identify which shelves 150 are not covered, such that antennas 190 may be relocated near those shelves. After operation 250, the process may return to operation 220 in order to continue the process with the new deployment of antennas (e.g., including the relocated antennas 190). The process may then repeat until the AP 130 determines that no antennas should be relocated, or until the process is stopped, such as by a user.

Figure 3:
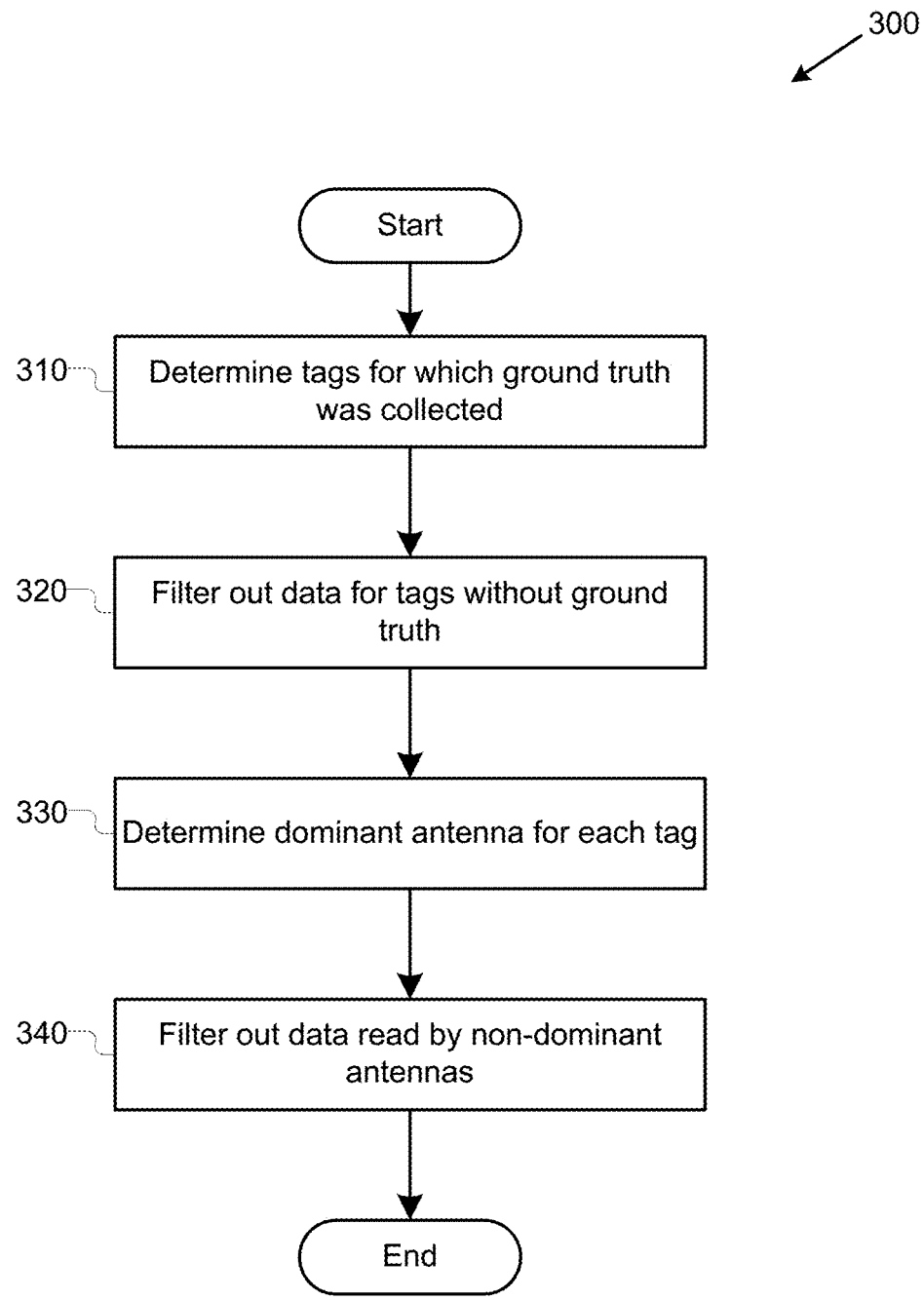
FIG. 3 illustrates an example process for filtering collected RFID data, in accordance with various embodiments.

FIG. 3 illustrates an example process 300 for the FM 110 to filter collected RFID data, in accordance with various embodiments. In various embodiments, process 300 may perform various embodiments of operation 230 of process 200 of FIG. 2. In various embodiments, algorithmic structures for the FM 110 may be described with reference to FIG. 3. It may be noted that, while particular ordering of information flows are illustrated, in various embodiments, operations may be otherwise ordered or omitted, or additional operations may be included. The process may begin at operation 310, where the FM 110 may determine tags for which ground truth was not obtained during the process of FIG. 2. At operation 320, any RFID data relating to tags without ground truth is filtered out from further consideration.

Next, at operation 330, the FM 110 may determine a dominant antenna for each tag has not been filtered out. In various embodiments, the FM 110 may determine, for a particular tag, whether there is an antenna which received a percentage of a total number of response signals that is over a threshold. This determination may be better understood with reference to FIG. 4, where example data sets used when filtering collected RFIC data are illustrated, in accordance with various embodiments. FIG. 4 illustrates an example count 400 of RFID tag reads received for a particular tag (tag 23) by five different RFID antennas 190. FIG. 5 illustrates an example 500 of corresponding percentages of the total RFID tag reads received by each antenna 190. Thus, if the FM 110 is configured to identify an antenna as a dominant antenna if it receives over 80% of the response signals for a particular tag, then the FM 110 would identify antenna "SN00035", which received almost 97% of the responses, as a dominant antenna. However, none of the percentages in example 500 were higher than 0.80, then the FM 110 would not identify tag 23 as having a dominant antenna. Returning to FIG. 3, at operation 340, the FM 110 may then filter out data which is read by antennas 190 which are not dominant for any tags. The process may then end.

Figure 6:
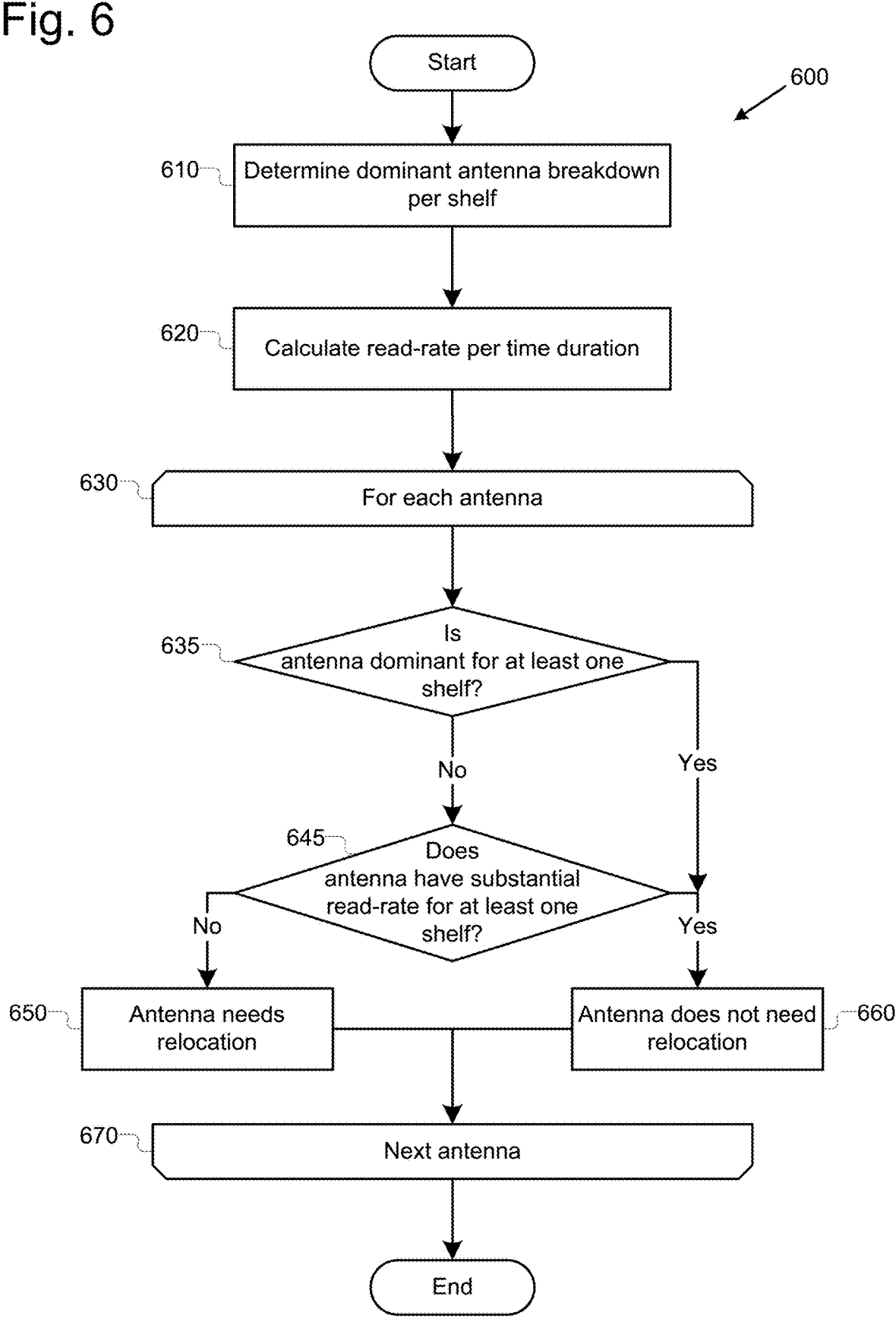
FIG. 6 illustrates an example process for the RLC to determine antennas to relocate, in accordance with various embodiments.

FIG. 6 illustrates an example process 600 for the for the RLC 100 to determine antennas to relocate, in accordance with various embodiments. In various embodiments, process 600 may perform various embodiments of operation 240 of process 200 of FIG. 2. In various embodiments, algorithmic structures for the AP 130 may be described with reference to FIG. 6. It may be noted that, while particular ordering of information flows are illustrated, in various embodiments, operations may be otherwise ordered or omitted, or additional operations may be included.

The process may begin at operation 610, where the AP 130 may determine a dominant antenna breakdown for each shelf. In various embodiments, at operation 610, the AP 130 may generate a count of all RFID tag reads for every pair of antenna 190 and shelf 150 (e.g., Shelf A and antenna "SN01210" or Shelf A and antenna "SN01277"), as well as a total count of all RFID tag reads for each shelf 150. The AP 130 may then, determine a dominant antenna breakdown by dividing the total count of each of the antenna 190/shelf 150 pairs by the total number of RFID tag reads for the associated shelf 150. Referring now to FIG. 7, an example 700 of a dominant antenna breakdown is shown. In this breakdown, a number of RFID tag reads for each antenna 190/shelf 150 pair is shown, along with a total number of RFID tag reads for that shelf. The breakdown is then shown, which is, for each pair, the percentage of total reads represented by that pair. This breakdown demonstrates how dominant each particular RFID antenna 190 is for each shelf 150, thus identifying a potential dominant antenna 190 for the shelf 150. In various embodiments, the AP 130 may consider an antenna 190 to be "dominant" if it is greater than a predetermined threshold.

Returning to FIG. 6, at operation 620, the AP 130 may determine a read-rate per time duration based on the filtered RFID data. In various embodiments, at operation 620, the AP 130 may grouping the filtered RFID data into two different categories a count of all tag reads for every antenna 190/shelf 150 pair, and a count of unique tags read for each shelf 150. The AP 130 may then determine a read-rate for a specific time duration for each pair by dividing the total count of each antenna 180/shelf 150 pair for a given shelf 150 by the total number of unique tag reads for the given antenna 190/shelf 150 pair, and then multiplying the result by a specified time duration. This result may then be divided by the total time duration over which the RFID data was taken. The resulting value may be considered a read-rate for an antenna 190/shelf 150 pair.

Next, at loop operation 630, the AP 130 may perform a loop over each of the antennas 190 for which RFID data has been collected and filtered. Then, at decision operation 635, the AP 130 may determine if the current antenna 190 is dominant for at least one shelf. In various embodiments, at decision operation 635, the AP 130 may compare a dominant antenna breakdown value for each shelf 150 for the current antenna 190 to a predetermined threshold to determine if it is dominant. For example, referring now to FIGS. 8 and 9, example dominant antenna breakdowns 800 and 900 are provided. In each, the breakdown for antenna "SN01210" is shown relative to a set of six "racks", which are shelves 150. In example 800 it may be noted that, for rack 10, the antenna "SN01210" has almost 43% of the RFID tag reads for that shelf. In various embodiments, this value may be considered by the AP 130 to be sufficiently large to consider antenna "SN01210" as a dominant antenna for that shelf. In this case, the result of decision operation 635 is "Yes". By contrast, in example 900, no shelf exhibits more than 28% of its RFID tag reads as coming from antenna "SN01210". In this case, AP 130 may determine that antenna "SN01210" is not dominant, and the result of decision operation 635 is "No".

Returning to FIG. 6, if the result of decision operation 635 is "Yes", then the AP 130 may determine at operation 660 that the current antenna 190 does not need relocation and at loop operation 670 may continue to the next antenna 190. However, the current antenna 190 is not dominant, then the AP 130 may, at decision operation 645, determine if the current antenna 190 has a sufficient read-rate for at least one shelf 150. In various embodiments, at decision operation 645, the AP 130 may compare a read-rate for each shelf 150 for the current antenna 190 to a predetermined threshold to determine if it is a sufficient read-rate. For example, referring now to FIGS. 10 and 11, example dominant antenna breakdowns 1000 and 1100 are provided. In example 1000 it may be noted that, for the antenna "SN01210" has almost numerous read-rates, such as for all shelves 150 but I1 and J1, which are relatively high. In various embodiments, these values may be considered by the AP 130 to be sufficiently large to consider antenna "SN01210" to have a sufficient read-rate for at least one shelf. In this case, the result of decision operation 645 is "Yes". By contrast, in example 1100, the read-rates are low for all shelves 150. In various embodiments, these values may be considered by the AP 130 to be insufficiently large to consider antenna "SN01210" to have a sufficient read-rate for any shelves 150. In this case, the result of decision operation 645 is "No".

Returning to FIG. 6, if the result of decision operation 645 is "Yes", then the AP 130 may determine at operation 660 that the current antenna 190 does not need relocation and at loop operation 670 may continue to the next antenna 190. However, the current antenna 190 does not have a sufficient read-rate for a shelf 150, then the AP 130 may, at operation 650, determine that the current antenna 190 needs to be relocated. The process may then continue to the next antenna 190 at loop operation 670. If there are no further antennas 190, the process may then end.

Figure 12:
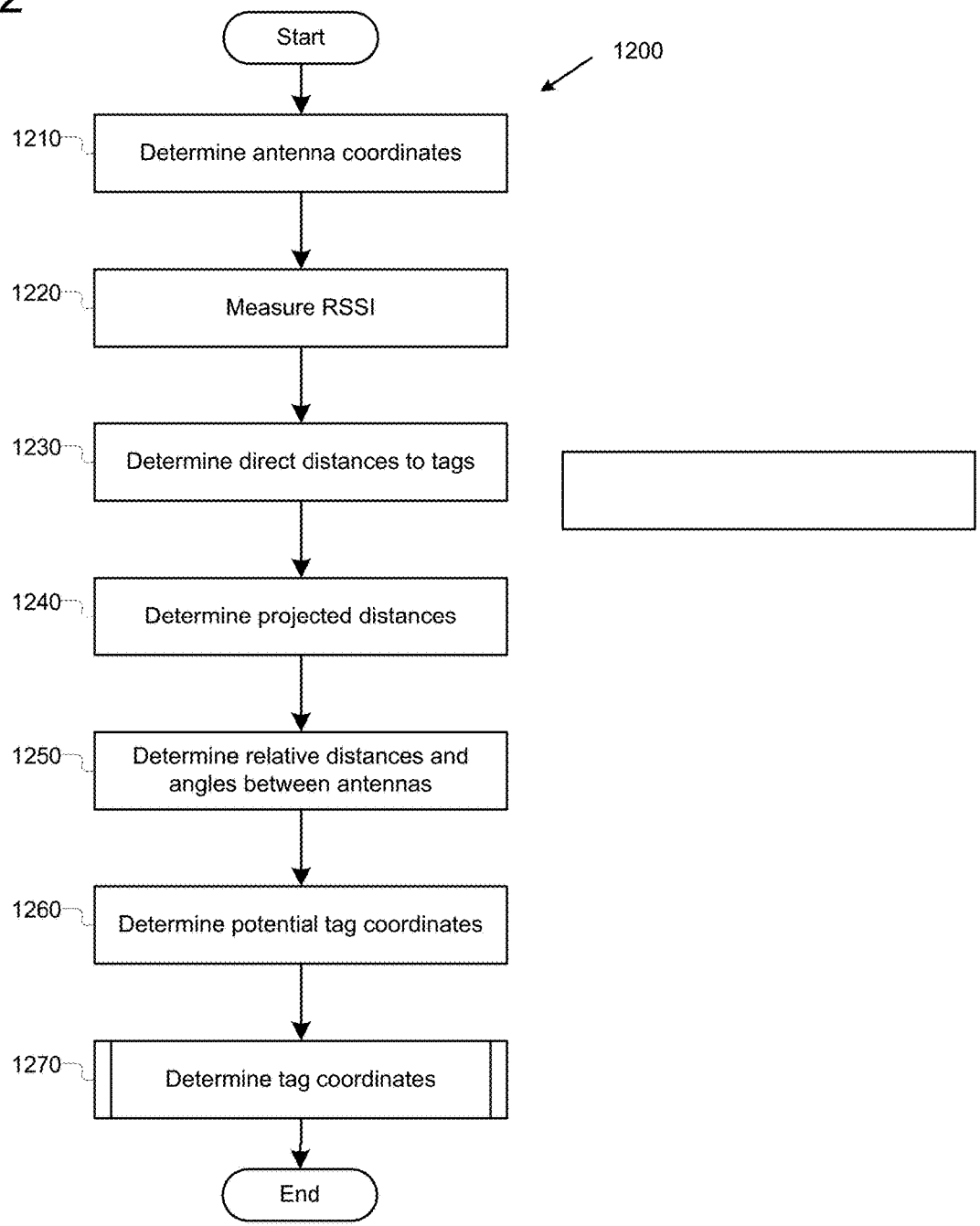
FIG. 12 illustrates an example process for the RLC to determine an RFID tag location, in accordance with various embodiments.
Figure 13:
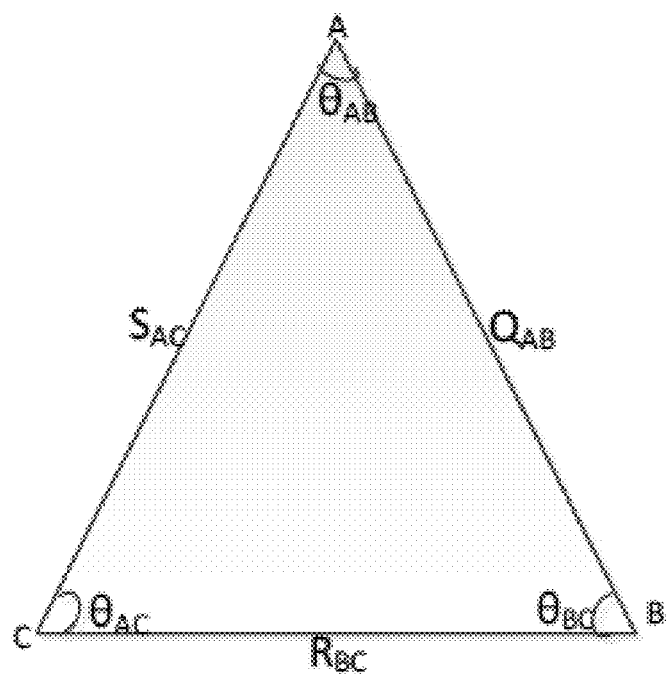
FIGS. 13-16 illustrate examples of determinations of distances of RFID tags from RFID antennas which are utilized by the RLC to determine RFID tag location.
Figure 14:
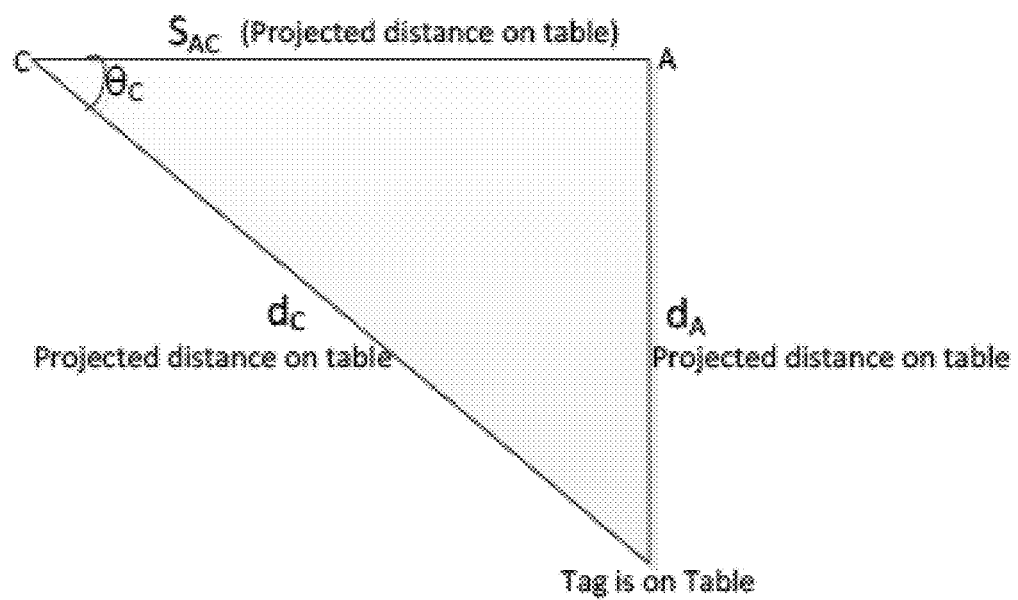
Figure 15:
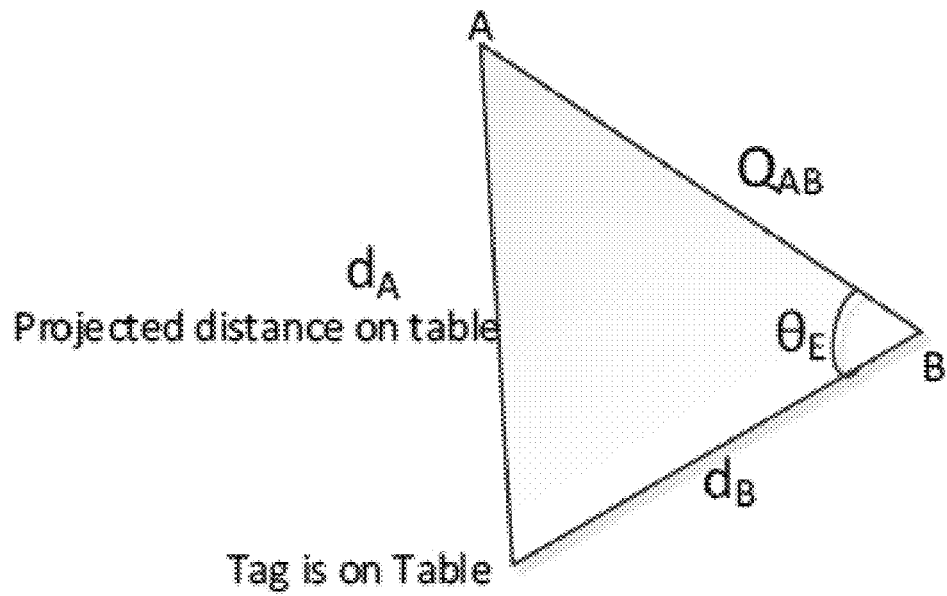
Figure 16:
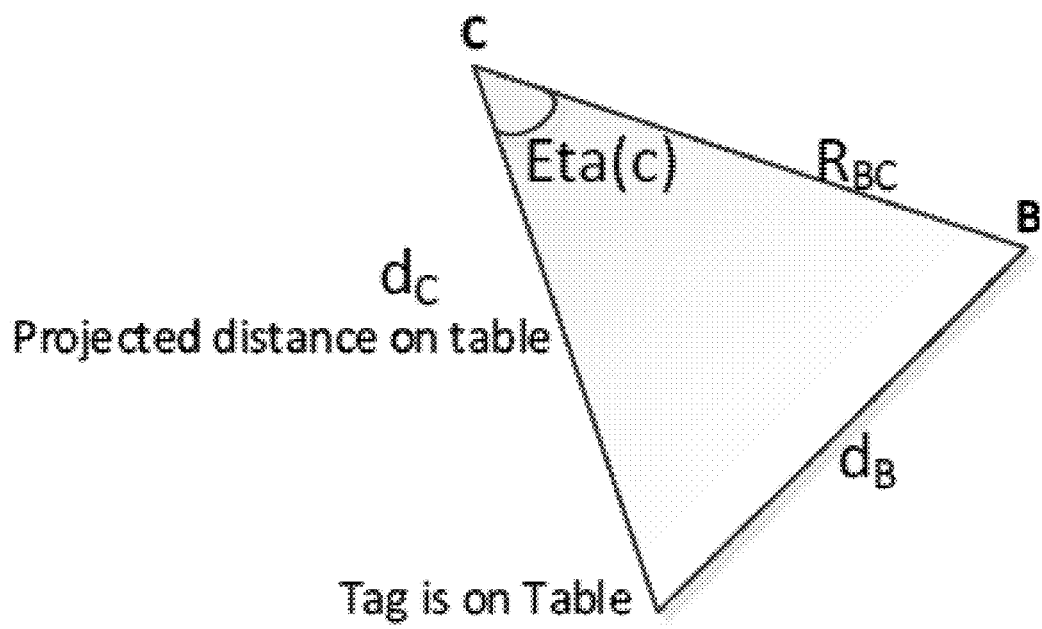

FIG. 12 illustrates an example process 1200 for the RLC 100 to determine an RFID tag location, in accordance with various embodiments. In various embodiments, algorithmic structures for the TLD 140 may be described with reference to FIG. 12. It may be noted that, while particular ordering of information flows are illustrated, in various embodiments, operations may be otherwise ordered or omitted, or additional operations may be included.

The process may begin at operation 1210, where the TLD 140 may determine coordinates of one or more antennas 190 in the physical space. In various embodiments, these coordinates may be entered manually by a user, or obtained directly from the antennas themselves. In various embodiments, the coordinates of the antennas 190 may be obtained after execution of process 200 of FIG. 2 to determine placement of the antennas 190 to better cover the physical space. Herein these coordinates may, for an example antenna A, be referred to as $\{X_A, Y_A, Z_A\}$. Next, at operation 1220, the TLD 140 may measure a relative signal strength indicator (RSSI) for a measured RFID tag, as measured by multiple antennas 190. In various embodiments, techniques for measuring the RSSI for an RFID tag read may be known. Next, at operation 1230, the TLD 140 may determine, for each antenna 190, a direct distance from the antenna 190 to the read RFID tag. In various embodiments, the TLD 190 may determine this direct distance by computing:

$$X_{Acal}=10-\{(RSSI \rightarrow A) \rightarrow (10*B)\}+\{C*RSSI+D\},$$

where A, B, C, and D are empirically-determined coefficients, which may vary from application to application, depending on e.g., a precision level desired.

Next, at operation 1240, the TLD 140 may determine projected distances from the antennas 190 to the read RFID tag. In various embodiments, these projected distances may include distances measured along an XY plane parallel to the floor or ceiling of the space, rather than a direct distance across XYZ space. Thus, the TLD 140 may determine these projected distances by computing:

$$d_A = SQRT(X_{Acal}^2 - \Delta H^2)$$

$$d_B = SQRT(X_{Bcal}^2 - \Delta H^2)$$

$$d_C = SQRT(X_{Ccal}^2 - \Delta H^2),$$

where ΔH represents a difference in height (e.g, difference in a Z axis) between a height of the measured tag and a height of the antenna 190. In various embodiments, the height of the RFID tag may be determined with reference to the shelf 150 on which the RFID tag can be found.

Next, at operation 1250, the TLD 140 may determine relative distances and angles between the antennas in the space. Referring now to FIGS. 13-16, examples are illustrated of distances and angles which may be determined between three antennas, A, B, and C, as well as between the RFID tag which is being measured. In various embodiments, the distances shown in FIG. 13 may be determined as follows:

Antenna A & C: $S_x=|X_A-X_C|, S_Y=|Y_A-Y_C|, S_{AC}=\text{SQRT}(S_X^2+S_Y^2)$

Antenna A & B: $Q_x=|X_B-X_A|, Q_Y=|Y_B-Y_A|, Q_{AB}=\text{SQRT}(Q_X^2+Q_Y^2)$

Antenna B & C: $R_x=|X_B-X_C|, R_Y=|Y_B-Y_C|, R_{BC}=\text{SQRT}(R_X^2+R_Y^2)$ $\theta_{BC}=A\cos\{Q_{AB}^2+R_{BC}^2-S_{AC}^2\}/\{2Q_{AB}*R_{BC}\}$ $\theta_{AB}=A\cos\{Q_{AB}^2+S_{AC}^2-R_{BC}^2\}/\{2Q_{AB}*S_{AC}\}$ $\theta_{AC}=A\cos\{S_{AC}^2+R_{BC}^2-Q_{AB}^2\}/\{2S_{AC}*R_{BC}\}$ $\theta_C=A\cos\{S_{AC}^2+d_C^2-d_A^2\}/\{2S_{AC}*d_C\}$ $\theta_E=A\cos\{Q_{AB}^2+d_B^2-d_A^2\}/\{2Q_{AB}*d_B\}$ $\eta_C=A\cos\{R_{BC}^2+d_C^2-d_B^2\}/\{2R_{BC}*d_C\}$ $\alpha=A\sin\{S_Y/S_{AC}\}$ $\gamma=A\sin\{Q_Y/Q_{AB}\}$ $\beta_1=\theta_C-\alpha$ $\beta_2=\theta_C+\alpha$ $\omega=\gamma-\theta_E$ $\eta=\pi-(2*\theta_E)-\omega$ $\eta_B=A\tan\{Y_B-Y_C\}/\{X_B-X_C\}$.

Next, at operation 1260, the TLD 140 may determine multiple potential RFID tag coordinates. In various embodiments, up to six potential tag coordinate pairs (e.g. $(X_1, Y_1)$) may be determined:

Tag $X_1=X_C+d_C*\cos\beta_1$

Tag $Y_1=Y_C+d_C*\sin\beta_1$

Tag $X_2=X_B-d_B*\cos\omega$

Tag $Y_2=Y_B-d_B*\sin\omega$

Tag $X_3=X_C+d_C*\cos\beta_2$

Tag $Y_3=Y_C-d_C*\sin\beta_2$

Additional Tag co-ordinate calculation:

Tag $X_4=X_B+d_B*\cos\eta$

Tag $Y_4=Y_B-d_B*\sin\eta$

Tag $X_5=X_C-d_C*\cos(\eta_C-\eta_B)$

Tag $Y_5=Y_C-d_C*\sin(\eta_C-\eta_B)$

Tag $X_6=X_C+d_C*\cos(\eta_C+\eta_B)$

Tag $Y_6=Y_C+d_C*\sin(\eta_C+\eta_B)$

In various embodiments, multiple potential RFID tag coordinates may be determined in order to determine final coordinates as an average of an RFID tag coordinate triplet. After determination of the potential RFID tag coordinates, at operation 1270, the TDL 140, may select the best potential RFID tag coordinate triplet and, from that triplet, determine the coordinates for the read RFID tag. In various embodiments, particular implementation details of operation 1270 may be described below with reference to process 1700 of FIG. 17.

Figure 17:
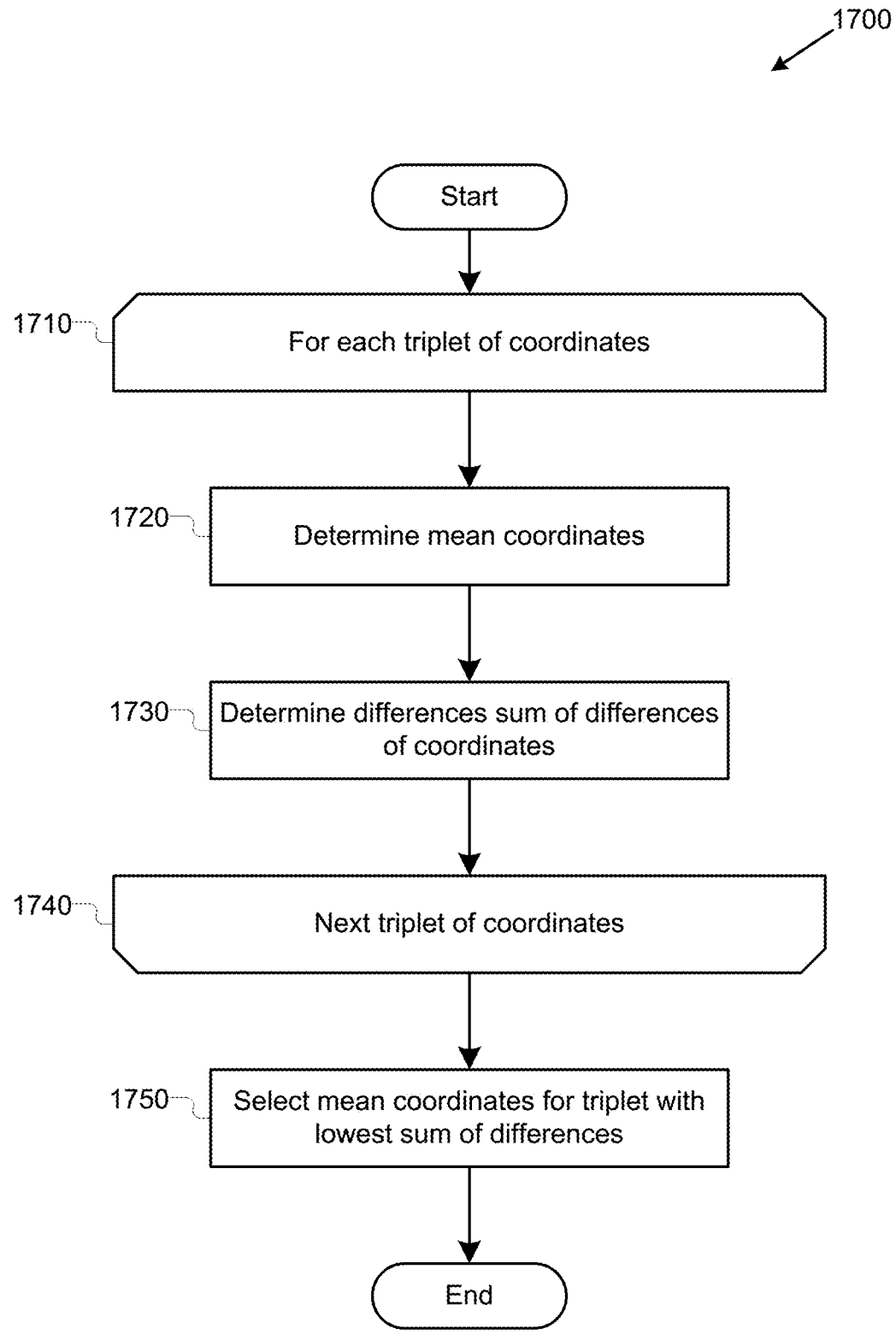
FIG. 17 illustrates an example process for the RLC to determine RFID tag coordinates, in accordance with various embodiments.

FIG. 17 illustrates an example process 1700 for the RLC to determine RFID tag coordinates, in accordance with various embodiments. In various embodiments, process 1700 may perform various embodiments of operation 1270 of process 1200 of FIG. 12. In various embodiments, algorithmic structures for the TLD 140 may be described with reference to FIG. 17. It may be noted that, while particular ordering of information flows are illustrated, in various embodiments, operations may be otherwise ordered or omitted, or additional operations may be included. The process may begin at loop operation 1710, where a loop may begin for each triplet of coordinates. Thus, a first iteration of the loop may be performed for $\{(X_1, Y_1), (X_2, Y_2), (X_3, Y_3)\}$, another for $\{(X_1, Y_1), (X_2, Y_2), (X_4, Y_4)\}$, another for $\{(X_5, Y_5), (X_2, Y_2), (X_3, Y_3)\}$, etc.

At operation 1720, the TLD 140 may determine mean coordinates for the current triplet. For example, for the triplet $\{(X_1, Y_1), (X_2, Y_2), (X_3, Y_3)\}$, at operation 1720, the TLD 140 may determine:

$X_{mean}=(\text{Tag}X_1+\text{Tag}X_2+\text{Tag}X_3)/3$ $Y_{mean}=(\text{Tag}Y_1+\text{Tag}Y_2+\text{Tag}Y_3)/3$.

Next, at operation 1730, the TLD 140 may determine a sum of differences for the triplet by calculating:

$\text{SUM}=\text{SQRT}((\text{Tag}X_1-\text{Tag}X_2)^2+(\text{Tag}Y_1-\text{Tag}Y_2)^2)+\text{SQRT}((\text{Tag}X_1-\text{Tag}X_3)^2+(\text{Tag}Y_1-\text{Tag}Y_3)^2)+\text{SQRT}((\text{Tag}X_2-\text{Tag}X_3)^2+(\text{Tag}Y_2-\text{Tag}Y_3)^2)$ In various embodiments, this sum of differences may indicate how close together the potential RFID tag coordinates are, and thus the quality of fit of the current triplet. Next, at operation 1740, the loop may continue for the next triplet. Finally, at operation 1750, the TLD 140 may select the mean coordinates for the triplet with the lowest sum of differences as the coordinates for the read RFID tag. The process may then end.

Figure 18:
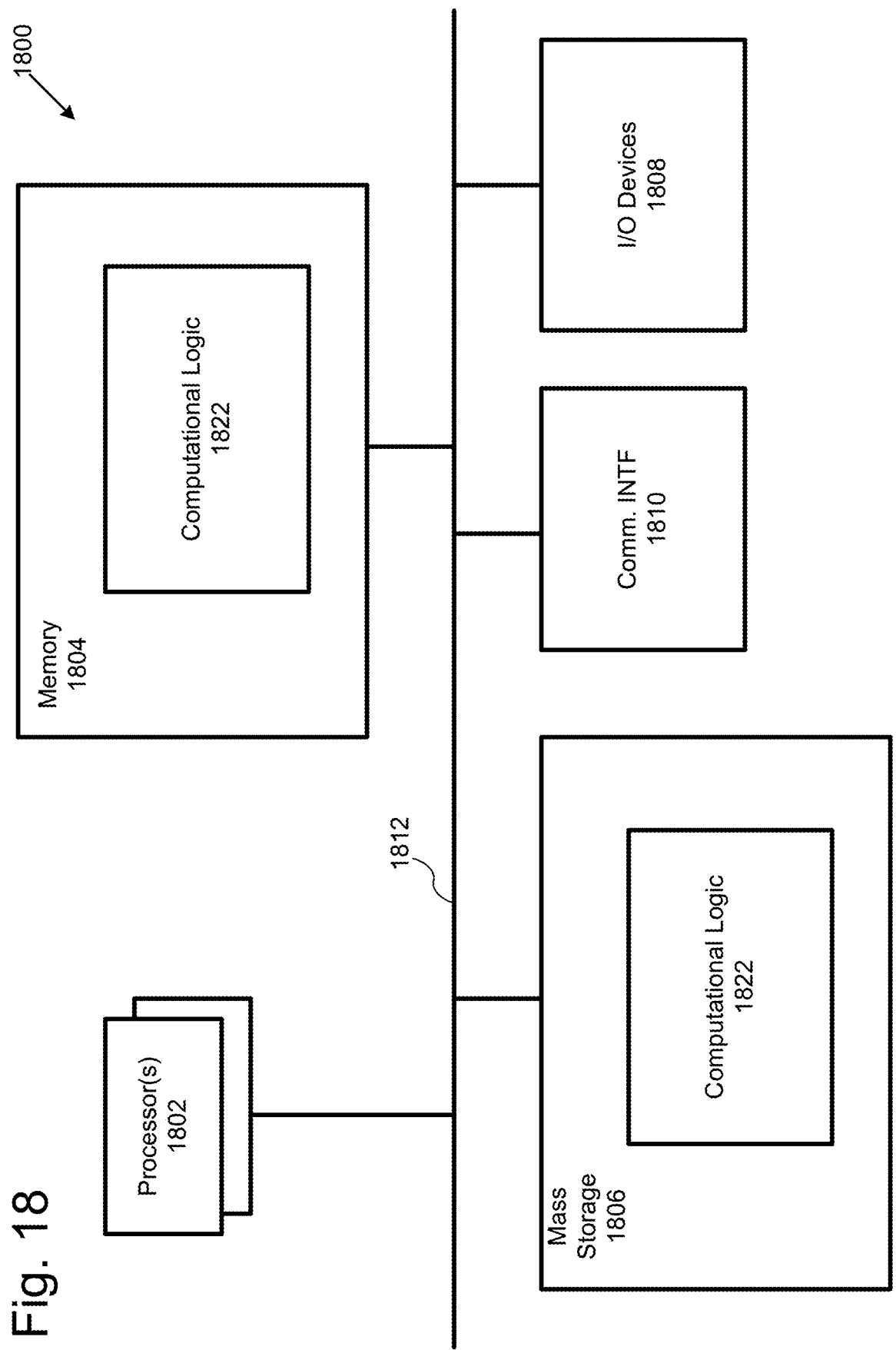
FIG. 18 illustrates an example computing environment suitable for practicing various aspects of the present disclosure, in accordance with various embodiments.

Referring now to FIG. 18, a block diagram of an example architecture of a computing device suitable for use to practice as the RLC 100, in accordance with various embodiments, is illustrated. As shown, computing device 1800 may include one or more processors 1802, each having one or more processor cores, and persistent memory 1804. Additionally, computing device 1800 may include communication interfaces 1810, such as, Ethernet, WiFi, Bluetooth, 3G/4G and so forth, and I/O device 1808 may include cameras, display devices, keyboard, cursor control and so forth. The elements may be coupled to each other via system bus 1806, which may represent one or more buses. In the case of multiple buses, they may be bridged by one or more bus bridges (not shown).

Each of these elements may perform its conventional functions known in the art. In particular, persistent memory 1804 may be employed to store a copy of computing logic 1822 implementing some or all of the operations described earlier, e.g., but not limited to, facilitation of antenna 190 placement, determination of RFID tag location, and so forth, performed by FM 110, AP 130, TLD 140, and so forth. Computing logic 1822 may be implemented in assembler instructions supported by processor(s) 1802 or high-level languages, such as, for example, C or a scripting language, that can be compiled into such instructions. The programming instructions may be placed into persistent memory 1804 in the factory, or in the field, through, for example, a distribution medium (not shown), such as a compact disc, or through communication interface 1810 (from a distribution server (not shown)). The number, capability and/or capacity of these elements 1802-1810 may vary from embodiments to embodiments. The constitutions of these elements 1802-1810 are otherwise known, and accordingly will not be further described.

Figure 19:
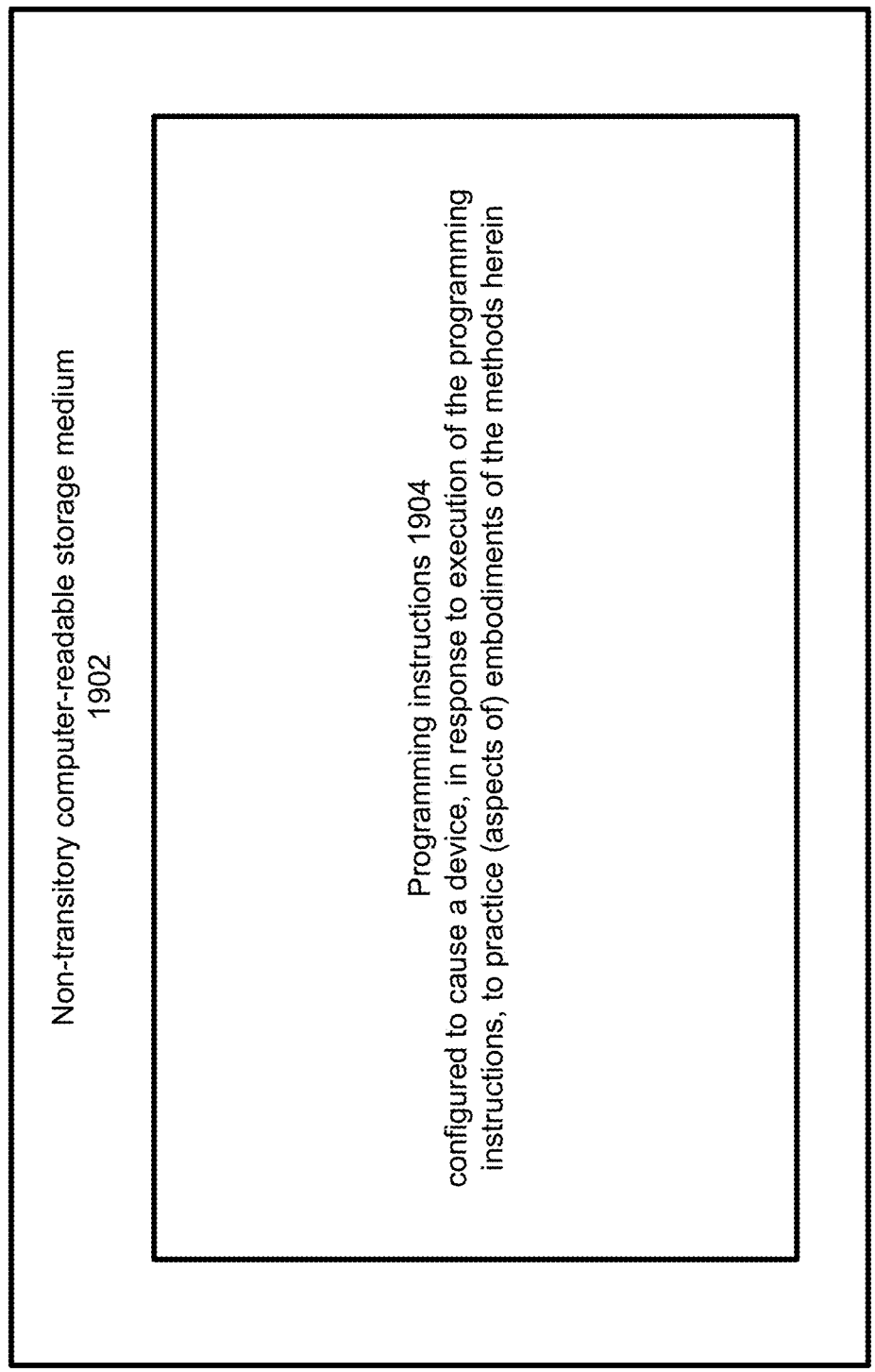
FIG. 19 illustrates an example storage medium with instructions configured to enable an apparatus to practice various aspects of the present disclosure, in accordance with various embodiments.

FIG. 19 illustrates an example non-transitory computer-readable storage medium having instructions configured to practice all or selected ones of the operations associated with the RLC 100, and so forth, earlier described, in accordance with various embodiments. As illustrated, non-transitory computer-readable storage medium 1902 may include a number of programming instructions 1904. Programming instructions 1904 may be configured to enable a device, e.g., the RLC 100, in response to execution of the programming instructions, to perform various operations earlier described, including but not limited to, facilitation of antenna 190 placement, determination of RFID tag location, and so forth, performed by FM 110, AP 130, TLD 140, and so forth. In alternate embodiments, programming instructions 1904 may be disposed on multiple non-transitory computer-readable storage media 1902 instead. In still other embodiments, programming instructions 1904 may be encoded in transitory computer readable signals. The programming instruction may also include piece of software that protects or encrypts the data in the memory, storage, data being processed, and in communication channel being exposed to the hackers.

Referring back to FIG. 18, for one embodiment, at least one of processors 1802 may be packaged together with a computer-readable storage medium having computing 1822 (in lieu of storing in system memory 1804) configured to practice all or selected aspects of the earlier described operations. For one embodiment, at least one of processors 1802 may be packaged together with a computer-readable storage medium having computing logic 1822 to form a System in Package (SiP). For one embodiment, at least one of processors 1802 may be integrated on the same die with a computer-readable storage medium having computing logic 1822. For one embodiment, at least one of processors 1802 may be packaged together with a computer-readable storage medium having computing logic 1822 to form a System on Chip (SoC).

Computer-readable media (including at least one computer-readable media), methods, apparatuses, systems and devices for performing the above-described techniques are illustrative examples of embodiments disclosed herein. Additionally, other devices in the above-described interactions may be configured to perform various disclosed techniques. Particular examples of embodiments, described herein include, but are not limited to, the following:

Example 1 may include a radio frequency identification (RFID) antenna location configuration apparatus. The apparatus may include one or more computer processors. The apparatus may further include an RFID data collector to operate on the one or more computer processors to collect RFID data read from RFID tags located in a physical space by a plurality of RFID antennas located in the space. The apparatus may further include an RFID antenna placement module (AP) coupled to the RFID data collector to operate on the one or more computer processors to determine, based on the collected RFID data, whether one or more of the plurality of RFID antennas may be to be relocated in the space.

Example 2 may include the apparatus of example 1, and may further include a filtering module coupled to the RFID data collector and the RFID antenna placement module and to operate on the one or more computer processors to filter the RFID data prior to determination whether one or more of the plurality of RFID antennas may be to be relocated.

Example 3 may include the apparatus of example 2, wherein the filtering module may be to filter out RFID data for RFID tags for which no ground truth information may be known.

Example 4 may include the apparatus of example 2, wherein the filtering module may be to filter out RFID data read for a RFID tag by a RFID antenna which may be not dominant for that RFID tag.

Example 5 may include the apparatus of any of examples 1-4, wherein the apparatus may further include ground truth storage coupled to the AP, the ground truth storage to store known locations for one or more RFID tags in the space.

Example 6 may include the apparatus of any of examples 1-4, wherein the AP may be to determine, for an RFID antenna of the plurality of RFID antennas, whether the RFID antenna may be a dominant antenna for a shelf, rack, table, or other location-based unit which includes one or more of the RFID tags.

Example 7 may include the apparatus of any of examples 1-4, wherein the AP may be to determine, for an RFID antenna of the one or more RFID antennas, whether the RFID antenna has a read rate in excess of a read threshold for a shelf, rack, table, or other location-based unit which includes one or more of the RFID tags.

Example 8 may include the apparatus of any of examples 1-4, wherein the AP may be to determine, for an RFID antenna which is not a dominant RFID antenna for a shelf, rack, table, or other location-based unit and which does not have a read rate in excess of a read threshold for a shelf, rack, table, or other location-based unit, that the RFID antenna may be to be relocated.

Example 9 may include the apparatus of any of examples 1-4, wherein the RFID data collector may be to determine a first set of one or more of the plurality of RFID antennas may be to be relocated and the AP may be to repeat collection and determination of whether one or more of the plurality of the RFID antennas may be to be relocated after the first set of the RFID antennas may be relocated.

Example 10 may include a radio frequency identification (RFID) tag location apparatus. The apparatus may include one or more computer processors. The apparatus may further include an RFID data collector to operate on the one or more computer processors to cause one or more RFID antennas to request and receive RFID response signals from an RFID tag located in a space. The apparatus may further include an RFID tag location determination module (TLD) coupled to the RFID data collector to operate on the one or more computer processors to determine a location of the RFID tag in the space, wherein the TLD may be to determine the location based on signal strength of the RFID response signals received by the one or more RFID antennas and location information for the one or more RFID antennas.

Example 11 may include the apparatus of example 10, wherein the RFID data collector may be to collect signal strength information through collection of radio frequency signal strength indicator (RSSI) data for one or more readings performed of the RFID tag by each of the one or more RFID antennas located in the space.

Example 12 may include the apparatus of example 11, wherein the TLD may be to determine direct distances from each of the one or more antennas to the RFID tag based at least in part on the collected RSSI data.

Example 13 may include the apparatus of example 11, wherein the TLD may be to determine projected distances from each of the one or more antennas to the RFID tag based at least in part on the determined direct distances.

Example 14 may include the apparatus of example 13, wherein the TLD may be to determine one or more potential RFID tag coordinates based on the determined projected distances.

Example 15 may include the apparatus of example 13, wherein the TLD may be to determine coordinates of the RFID tag as a mean of multiple potential RFID tag coordinates out of the one or more potential RFID tag coordinates.

Example 16 may include the apparatus of example 15, wherein the TLD may be to select a triplet of potential RFID tag coordinates and to determine a mean of the selected triplet.

Example 17 may include a computer-implemented method for configuring radio frequency identification (RFID) antenna locations. The method may include: collecting, by a computer system, RFID data read from RFID tags located in a physical space by a plurality of RFID antennas located in the space and determining, by the computer system, based on the collected RFID data, whether one or more of the plurality of RFID antennas may be to be relocated in the space.

Example 18 may include the method of example 17, and may further include filtering, by the computer system, the RFID data prior to determination whether one or more of the plurality of RFID antennas may be to be relocated.

Example 19 may include the method of example 18, wherein filtering includes filtering out RFID data for RFID tags for which no ground truth information may be known.

Example 20 may include the method of example 18, wherein filtering includes filtering out RFID data read for a RFID tag by a RFID antenna which may be not dominant for that RFID tag.

Example 21 may include the method of any of examples 17-20, and may further include storing ground truth by the computer system, including storing known locations for one or more RFID tags in the space.

Example 22 may include the method of any of examples 17-20, wherein determining one or more of the plurality of RFID antennas may be to be relocated includes determining, for an RFID antenna of the plurality of RFID antennas, whether the RFID antenna may be a dominant antenna for a shelf, rack, table, or other location-based unit which includes one or more of the RFID tags.

Example 23 may include the method of any of examples 17-20, wherein determining one or more of the plurality of RFID antennas may be to be relocated includes determining, for an RFID antenna of the one or more RFID antennas, whether the RFID antenna has a read rate in excess of a read threshold for a shelf, rack, table, or other location-based unit which includes one or more of the RFID tags.

Example 24 may include the method of any of examples 17-20, wherein determining one or more of the plurality of RFID antennas may be to be relocated includes determining, for an RFID antenna which may be not a dominant RFID antenna for a shelf, rack, table, or other location-based unit and which does not have a read rate in excess of a read threshold for a shelf, rack, table, or other location-based unit, that the RFID antenna may be to be relocated.

Example 25 may include the method of any of examples 17-20, wherein collecting includes determining a first set of one or more of the plurality of RFID antennas may be to be relocated and wherein the method may further include repeating, by the computer system, collection and determination of whether one or more of the plurality of the RFID antennas may be to be relocated after the first set of the RFID antennas may be relocated.

Example 26 may include a method for determining a location for a radio frequency identification (RFID) tag. The method may include: causing, by a computer system, one or more RFID antennas to request and receive RFID response signals from an RFID tag located in a space and determining, by the computer system, a location of the RFID tag in the space based on signal strength of the RFID response signals received by the one or more RFID antennas and location information for the one or more RFID antennas.

Example 27 may include the method of example 26, and may further include collecting, by the computer system, signal strength information through collection of radio frequency signal strength indicator (RSSI) data for one or more readings performed of the RFID tag by each of the one or more RFID antennas located in the space.

Example 28 may include the method of example 27, wherein determining includes determining direct distances from each of the one or more antennas to the RFID tag based at least in part on the collected RSSI data.

Example 29 may include the method of example 27, wherein determining includes determining projected distances from each of the one or more antennas to the RFID tag based at least in part on the determined direct distances.

Example 30 may include the method of example 29, and may further include determining, by the computer system, one or more potential RFID tag coordinates based on the determined projected distances.

Example 31 may include the method of example 29, and may further include determining, by the computer system, coordinates of the RFID tag as a mean of multiple potential RFID tag coordinates out of the one or more potential RFID tag coordinates.

Example 32 may include the method of example 31, and may further include selecting, by the computer system, a triplet of potential RFID tag coordinates and wherein determining coordinates of the RFID tag as a mean includes determining a mean of the selected triplet.

Example 33 may include one or more computer-readable media containing instructions written thereon that, in response to execution by a computer system, cause the computing system to collect RFID data read from RFID tags located in a physical space by a plurality of RFID antennas located in the space and determine, based on the collected RFID data, whether one or more of the plurality of RFID antennas may be to be relocated in the space.

Example 34 may include the computer-readable media of example 33, wherein the instructions may be further to cause the computer system to filter the RFID data prior to determination whether one or more of the plurality of RFID antennas may be to be relocated.

Example 35 may include the computer-readable media of example 34, wherein filter includes filter out RFID data for RFID tags for which no ground truth information may be known.

Example 36 may include the computer-readable media of example 34, wherein filter includes filter out RFID data read for a RFID tag by a RFID antenna which may be not dominant for that RFID tag.

Example 37 may include the computer-readable media of any of examples 33-36, wherein the instructions may be further to cause the computer system to store ground truth by the computer device, including store known locations for one or more RFID tags in the space.

Example 38 may include the computer-readable media of any of examples 33-36, wherein determine one or more of the plurality of RFID antennas may be to be relocated includes determine, for an RFID antenna of the plurality of RFID antennas, whether the RFID antenna may be a dominant antenna for a shelf, rack, table, or other location-based unit which includes one or more of the RFID tags.

Example 39 may include the computer-readable media of any of examples 33-36, wherein determine one or more of the plurality of RFID antennas may be to be relocated includes determine, for an RFID antenna of the one or more RFID antennas, whether the RFID antenna has a read rate in excess of a read threshold for a shelf, rack, table, or other location-based unit which includes one or more of the RFID tags.

Example 40 may include the computer-readable media of any of examples 33-36, wherein determine one or more of the plurality of RFID antennas may be to be relocated includes determine, for an RFID antenna which is not a dominant RFID antenna for a shelf, rack, table, or other location-based unit and which does not have a read rate in excess of a read threshold for a shelf, rack, table, or other location-based unit, that the RFID antenna may be to be relocated.

Example 41 may include the computer-readable media of any of examples 33-36, wherein collect includes determine a first set of one or more of the plurality of RFID antennas are to be relocated and wherein the instructions may be further to cause the computer system to repeat collection and determination of whether one or more of the plurality of the RFID antennas may be to be relocated after the first set of the RFID antennas may be relocated.

Example 42 may include one or more computer-readable media containing instructions written thereon that, in response to execution by a computer system, cause the computing system to: cause one or more RFID antennas to request and receive RFID response signals from an RFID tag located in a space and determine a location of the RFID tag in the space based on signal strength of the RFID response signals received by the one or more RFID antennas and location information for the one or more RFID antennas.

Example 43 may include the computer-readable media of example 42, wherein the instructions may be further to cause the computer system to collect signal strength information through collection of radio frequency signal strength indicator (RSSI) data for one or more readings performed of the RFID tag by each of the one or more RFID antennas located in the space.

Example 44 may include the computer-readable media of example 43, wherein determine includes determine direct distances from each of the one or more antennas to the RFID tag based at least in part on the collected RSSI data.

Example 45 may include the computer-readable media of example 43, wherein determine includes determine projected distances from each of the one or more antennas to the RFID tag based at least in part on the determined direct distances.

Example 46 may include the computer-readable media of example 45, wherein the instructions may be further to cause the computer system to determine one or more potential RFID tag coordinates based on the determined projected distances.

Example 47 may include the computer-readable media of example 45, wherein the instructions may be further to cause the computer system to determine coordinates of the RFID tag as a mean of multiple potential RFID tag coordinates out of the one or more potential RFID tag coordinates.

Example 48 may include the computer-readable media of example 47, wherein the instructions may be further to cause the computer system to select a triplet of potential RFID tag coordinates and wherein determine coordinates of the RFID tag as a mean includes determine a mean of the selected triplet.

Example 49 may include an apparatus for configuring radio frequency identification (RFID) antenna locations, including: collecting, by a computer system, RFID data read from RFID tags located in a physical space by a plurality of RFID antennas located in the space and determining, by the computer system, based on the collected RFID data, whether one or more of the plurality of RFID antennas may be to be relocated in the space.

Example 50 may include the apparatus of example 49, and may further include means for filtering the RFID data prior to determination whether one or more of the plurality of RFID antennas may be to be relocated.

Example 51 may include the apparatus of example 50, wherein means for filtering include means for filtering out RFID data for RFID tags for which no ground truth information may be known.

Example 52 may include the apparatus of example 50, wherein means for filtering include means for filtering out RFID data read for a RFID tag by a RFID antenna which may be not dominant for that RFID tag.

Example 53 may include the apparatus of any of examples 49-52, and may further include means for storing ground truth by the computer system, including means for storing known locations for one or more RFID tags in the space.

Example 54 may include the apparatus of any of examples 49-52, wherein means for determining one or more of the plurality of RFID antennas may be to be relocated include means for determining, for an RFID antenna of the plurality of RFID antennas, whether the RFID antenna may be a dominant antenna for a shelf, rack, table, or other location-based unit which includes one or more of the RFID tags.

Example 55 may include the apparatus of any of examples 49-52, wherein means for determining one or more of the plurality of RFID antennas may be to be relocated include means for determining, for an RFID antenna of the one or more RFID antennas, whether the RFID antenna has a read rate in excess of a read threshold for a shelf, rack, table, or other location-based unit which includes one or more of the RFID tags.

Example 56 may include the apparatus of any of examples 49-52, wherein means for determining one or more of the plurality of RFID antennas may be to be relocated include means for determining, for an RFID antenna which may be not a dominant RFID antenna for a shelf, rack, table, or other location-based unit and which does not have a read rate in excess of a read threshold for a shelf, rack, table, or other location-based unit, that the RFID antenna may be to be relocated.

Example 57 may include the apparatus of any of examples 49-52, wherein: means for collecting includes means for determining a first set of one or more of the plurality of RFID antennas may be to be relocated and wherein the apparatus may further include means for repeating, by the computer system, collection and determination of whether one or more of the plurality of the RFID antennas may be to be relocated after the first set of the RFID antennas may be relocated.

Example 58 may include an apparatus for determining a location for a radio frequency identification (RFID) tag. The apparatus may include means for causing one or more RFID antennas to request and receive RFID response signals from an RFID tag located in a space and means for determining a location of the RFID tag in the space based on signal strength of the RFID response signals received by the one or more RFID antennas and location information for the one or more RFID antennas.

Example 59 may include the apparatus of example 58, and may further include means for collecting signal strength information through collection of radio frequency signal strength indicator (RSSI) data for one or more readings performed of the RFID tag by each of the one or more RFID antennas located in the space.

Example 60 may include the apparatus of example 59, wherein means for determining include means for determining direct distances from each of the one or more antennas to the RFID tag based at least in part on the collected RSSI data.

Example 61 may include the apparatus of example 59, wherein means for determining include means for determining projected distances from each of the one or more antennas to the RFID tag based at least in part on the determined direct distances.

Example 62 may include the apparatus of example 61, and may further include means for determining one or more potential RFID tag coordinates based on the determined projected distances.

Example 63 may include the apparatus of example 61, and may further include means for determining coordinates of the RFID tag as a mean of multiple potential RFID tag coordinates out of the one or more potential RFID tag coordinates.

Example 64 may include the apparatus of example 63, and may further include means for selecting a triplet of potential RFID tag coordinates and wherein determining coordinates of the RFID tag as a mean may include determining a mean of the selected triplet.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus comprising:
   one or more computer processors;
   the one or more computer processors are to operate an RFID data collector to collect RFID data read from RFID tags located in a physical space by a plurality of RFID antennas located in the space, the RFID tags being located on one or more physical objects in the space;
   the one or more computer processors are to operate an RFID antenna placement module (AP) to:
   determine a dominant antenna breakdown value for each RFID antenna of the plurality of RFID antennas based on:
     a number of RFID antenna read operations performed by each RFID antenna on at least one physical object of the one or more physical objects, and
     a total number of RFID antenna read operations performed by all RFID antennas on the at least one physical object, and
   determine, based on the dominant antenna breakdown value of each RFID antenna, whether one or more RFID antennas of the plurality of RFID antennas are to be relocated in the space.

2. The apparatus of claim 1, wherein the one or more computer processors are to operate a filtering module to filter the RFID data prior to determination whether one or more of the plurality of RFID antennas are to be relocated.

3. The apparatus of claim 2, wherein the filtering module is to filter out RFID data for RFID tags for which no ground truth information is known.

4. The apparatus of claim 1, wherein, to determine the antenna breakdown value for each RFID antenna, the filtering AP is to divide the number of RFID antenna read operations performed by each RFID by the total number of read operations performed by all of the RFID antennas on the at least one physical object.

5. The apparatus of claim 1, wherein the apparatus further comprises ground truth storage coupled to the AP, the ground truth storage to store known locations for one or more RFID tags in the space.

6. The apparatus of claim 1, wherein the AP is to determine, a dominate RFID antenna of the plurality of RFID antennas for each physical object of the one or more physical objects based on the dominant antenna breakdown value of each RFID antenna.

7. The apparatus of claim 1, wherein the AP is to determine a read rate of each RFID antenna for a specified period of time, the read rate of each RFID antenna being based on a number of all RFID tag reads for every RFID antenna and every physical object and a number of unique RFID tags read for each physical object of the one or more physical objects.

8. The apparatus of claim 7, wherein the AP is further to determine the one or more RFID antennas to include, for of each physical objects, each RFID antenna that is not a dominant RFID antenna and which does not have a read rate in excess of a read threshold.

9. The apparatus of claim 1, wherein:
   the RFID data collector is to determine a first set of RFID antennas of the plurality of RFID antennas arc to be relocated; and
   the AP is to repeat collection and determination of whether a second set of RFID antennas of the plurality of the RFID antennas are to be relocated after the first set of the RFID antennas are relocated.

10. A radio frequency identification (RFID) tag location apparatus, comprising:
   one or more computer processors;
   the one or more computer processors are to operate an RFID data collector to cause one or more RFID antennas to request and receive RFID response signals from RFID tags located in a physical space, the RFID tags being located on one or more physical objects in the physical space;
   the one or more computer processors operate an RFID antenna placement module (AP) to:

determine a dominant antenna breakdown value for each RFID antenna of a plurality of RFID antennas based on a number of RFID antenna read operations performed by each RFID antenna on at least one physical object of the one or more physical objects, and a total number of RFID antenna read operations performed by all RFID antennas on the at least one physical object, and determine, based on the dominant antenna breakdown value of each RFID antenna, whether one or more RFID antennas of the plurality of RFID antennas are to be relocated in the space; and the one or more computer processors are to operate an RFID tag location determination module (TLD) to determine a location of each RFID tag of the RFID tags in the physical space, based on signal strength of the RFID response signals received by the one or more RFID antennas and location information of the one or more RFID antennas.

11. The apparatus of claim 10, wherein the RFID data collector is to collect signal strength information through collection of radio frequency signal strength indicator (RSSI) data for one or more readings performed of the RFID tag by each of the one or more RFID antennas located in the space.

12. The apparatus of claim 11, wherein the TLD is to determine direct distances from each of the one or more antennas to the RFID tag based at least in part on the collected RSSI data.

13. The apparatus of claim 12, wherein the TLD is to determine projected distances from each of the one or more antennas to the RFID tag based at least in part on the determined direct distances.

14. The apparatus of claim 13, wherein the TLD is to determine one or more potential RFID tag coordinates based on the determined projected distances.

15. The apparatus of claim 13, wherein the TLD is to determine coordinates of the RFID tag as a mean of multiple potential RFID tag coordinates out of one or more potential RFID tag coordinates.

16. The apparatus of claim 15, wherein the TLD is to select a triplet of potential RFID tag coordinates and to determine a mean of the selected triplet.

17. A computer-implemented method, comprising:
collecting, by a computer system, RFID data read from a plurality of RFID tags located in a physical space, the RFID data being based on signals received from the plurality of RFID tags by a plurality of RFID antennas located in the physical space, the plurality of tags being located on one or more physical objects;

determining, by the computer system, a dominant antenna breakdown value for each RFID antenna of the plurality of RFID antennas based on (i) a number of RFID antenna read operations performed by each RFID antenna on at least one physical object of the one or more physical objects and (ii) a total number of RFID antenna read operations performed by all RFID antennas on the at least one physical object; and determining, by the computer system, based on the determined dominant antenna breakdown value for each RFID antenna, whether one or more of the plurality of RFID antennas are to be relocated in the physical space.

18. The method of claim 17, further comprising filtering, by the computer system, the RFID data prior to determination whether one or more of the plurality of RFID antennas are to be relocated.

19. The method of claim 17, wherein determining one or more of the plurality of RFID antennas are to be relocated comprises determining whether the RFID antenna is to be relocated, for an RFID antenna which is not a dominant RFID antenna for one or more physical objects including one or more RFID tags and which does not have a read rate in excess of a read threshold for one or more other physical objects including one or more RFID tags.

20. One or more computer-readable media comprising instructions written thereon, wherein execution of the instructions by a computer system is to cause the computer system to:
collect RFID data read from RFID tags located in a physical space by a plurality of RFID antennas located in the space;

determine a dominant antenna breakdown value for each RFID antenna of the plurality of RFID antennas based on a number of RFID antenna read operations performed by each RFID antenna on at least one physical object of the one or more physical objects and a total number of RFID antenna read operations performed by all RFID antennas on the at least one physical object; and determine, based on the dominant antenna breakdown value of each RFID antenna, whether one or more of the plurality of RFID antennas are to be relocated in the space.

21. The computer-readable media of claim 20, wherein the instructions are further to cause the computer system to filter the RFID data prior to determination whether one or more of the plurality of RFID antennas are to be relocated.

22. The computer-readable media of claim 21, wherein, to filter, execution of the instructions is to cause the computer system to filter out RFID data read for an RFID tag by an RFID antenna which is not dominant for that RFID tag.

23. The computer-readable media of claim 20, wherein execution of the instructions is to cause the computer system to determine a dominate RFID antenna of the plurality of RFID antennas for each physical object of the one or more physical objects based on the dominant antenna breakdown value of each RFID antenna.

24. The computer-readable media of claim 10, wherein execution of the instructions is to cause the computer system to determine the one or more RFID antennas to include, for each physical object of the one or more physical objects, each RFID antenna that is not a dominant RFID antenna and does not have a read rate in excess of a read threshold.

25. The computer-readable media of claim 20, wherein execution of the instructions is to cause the computer system to:
determine a first set of RFIDantennas of the plurality of RFID antennas to be relocated; and
repeat collection and determination of whether one or more of the plurality of the RFID antennas are to be relocated after the first set of the RFID antennas are relocated.

* * * * *

UNITED STATES PATENT AND TRADEMARK OFFICE
CERTIFICATE OF CORRECTION

PATENT NO.         : 10,706,242 B2
APPLICATION NO.    : 15/199400
DATED              : July 7, 2020
INVENTOR(S)        : Michael Wu et al.

Page 1 of 1

It is certified that error appears in the above-identified patent and that said Letters Patent is hereby corrected as shown below:

Column 18
Line 45, "...for of each physical objects..." should read – "...for each physical object..."
Line 51, "...antennas arc to be..." should read – "...antennas to be ..."

Column 20
Line 55, "...RFIDantennas..." should read – "...RFID antennas..."

Signed and Sealed this
First Day of September, 2020

Andrei Iancu
*Director of the United States Patent and Trademark Office*